(12) United States Patent
Yi et al.

(10) Patent No.: US 10,264,475 B2
(45) Date of Patent: Apr. 16, 2019

(54) APPARATUS AND METHOD FOR AUTOMATICALLY PERFORMING NETWORK OPTIMIZATION PROCESS IN MOBILE COMMUNICATION SYSTEM

(71) Applicant: Samsung Electronics Co., Ltd., Gyeonggi-do (KR)

(72) Inventors: Byoung-Ha Yi, Seoul (KR); Seung-Hun Jang, Seoul (KR); Han-Seok Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 329 days.

(21) Appl. No.: 14/701,007

(22) Filed: Apr. 30, 2015

(65) Prior Publication Data
US 2015/0319626 A1    Nov. 5, 2015

(30) Foreign Application Priority Data

Apr. 30, 2014    (KR) .................. 10-2014-0052828

(51) Int. Cl.
| | |
|---|---|
| *H04W 72/12* | (2009.01) |
| *H04W 24/02* | (2009.01) |
| *H04W 72/04* | (2009.01) |
| *H04W 16/18* | (2009.01) |
| *H04B 7/06* | (2006.01) |

(52) U.S. Cl.
CPC ........... *H04W 24/02* (2013.01); *H04W 16/18* (2013.01); *H04W 72/0406* (2013.01); *H04W 72/0473* (2013.01); *H04W 72/1226* (2013.01); *H04B 7/0626* (2013.01); *H04B 7/0632* (2013.01)

(58) Field of Classification Search
CPC .............. H04N 1/00031; H04N 1/6033; H04L 29/08459; H04B 7/0626; H04B 7/0632; H04W 72/1226

See application file for complete search history.

(56) References Cited

U.S. PATENT DOCUMENTS

| | | | | |
|---|---|---|---|---|
| 8,743,709 | B1 * | 6/2014 | Stegall | H04L 65/1006 370/252 |
| 2004/0143428 | A1 * | 7/2004 | Rappaport | G06F 17/509 703/22 |
| 2008/0227448 | A1 * | 9/2008 | Kim | H04W 36/0077 455/434 |
| 2013/0040683 | A1 * | 2/2013 | Siomina | H04W 28/0236 455/517 |
| 2015/0319611 | A1 * | 11/2015 | Garcia | H04W 8/26 370/329 |

* cited by examiner

*Primary Examiner* — Salvador E Rivas
(74) *Attorney, Agent, or Firm* — The Farrell Law Firm, P.C.

(57) ABSTRACT

Disclosed is a method for performing a network optimization process in a mobile communication system. The method includes receiving UpLink Radio Frequency (UL RF) information about a UL signal which a at least one eNB receives from a device in which a drive test is performed, receiving DownLink (DL) RF information about a DL signal which the device receives from the at least one eNB, predicting an RF environment and performance for the at least one eNB based on the received UL RF information and DL RF information, and determining at least one parameter for network optimization which is applied to the network optimization process based on the predicted RF environment and performance for the at least one eNB.

16 Claims, 12 Drawing Sheets

APPARATUS AND METHOD FOR AUTOMATICALLY PERFORMING NETWORK OPTIMIZATION PROCESS IN MOBILE COMMUNICATION SYSTEM

PRIORITY

This application claims priority under 35 U.S.C. § 119(a) to a Korean Patent Application filed in the Korean Intellectual Property Office on Apr. 30, 2014 assigned Serial No. 10-2014-0052828, the contents of which are incorporated herein by reference.

BACKGROUND OF THE INVENTION

1. Field of the Invention

The present invention relates to an apparatus and method for automatically performing a network optimization process in a mobile communication system.

2. Description of the Related Art

When a new cell is deployed, a mobile communication system generally performs a network optimization process to optimize performance of the new cell before starting a service through the new cell.

FIG. 1 illustrates a network optimization process performed in a conventional mobile communication system.

Referring to FIG. 1, the network optimization process includes an analysis and optimization process 111 and a drive test process 113. The drive test process 113 may be performed in a device, e.g., a User Equipment (UE), and denotes a process in which the UE, when mounted on a vehicle, measures and collects DownLink (DL) Radio Frequency (RF) status information for an evolved Node B (eNB).

The DL RF status information may include various information, such as received signal channel quality information. The received signal channel quality information may include at least one of Received Signal Code Power (RSCP), a Reference Signal Strength Indicator (RSSI), Reference Signal Received Quality (RSRQ), a Carrier-to-Interference Noise Ratio (CINR), a Signal-to-Noise Ratio (SNR), and a BLock Error Rate (BLER), for example.

If a cell, i.e., an eNB is deployed, the drive test process 113 is performed, so a UE performs a drive test process by measuring and collecting DL RF status information for the eNB while moving along a preset test route. If the eNB is initially deployed, various parameters such as an RF parameter and an antenna parameter may be set by default.

The DL RF status information collected in the drive test process 113 is provided to the analysis and optimization process 111 in step 115, and an analysis engineer estimates an RF environment and performance of the eNB by analyzing the DL RF status information which is provided to the analysis and optimization process 111 in step 117. The analysis engineer directly dumps the DL RF status information collected in the drive test process 113 to the analysis and optimization process 111, and the DL RF status information collected in the drive test process 113 is provided to the analysis and optimization process 111.

If performance of the eNB which is collected under a condition of the default RF parameter and the default antenna parameter does not satisfy target performance targeted by the mobile communication system, the analysis engineer adjusts an RF parameter and an antenna parameter for the eNB based on the analysis result, to improve the performance of the eNB in step 119. Determination of whether the acquired performance of the eNB satisfies the target performance will be omitted herein.

A process including measuring and colleting the DL RF status information, analyzing the DL RF status information, adjusting the RF parameter and the antenna parameter, for example, is a network optimization process. If performance of the eNB which is acquired based on a related RF parameter and antenna parameter does not satisfy the target performance, a drive test engineer changes the related RF parameter and antenna parameter to re-perform the network optimization process based on the changed RF and antenna parameters. In this manner, the network optimization process is repetitively performed until the performance of the eNB satisfies the target performance. A detailed description of the network optimization process will be omitted herein.

The network optimization process performed in the conventional mobile communication system requires many skilled engineers and is time-consuming, which is why the network optimization process is performed by skilled engineers using collected DL RF status information in a trial-and-error manner.

As described above, the network optimization process is performed based on DL RF status information of a related eNB. Thus, performance of the network optimization process may be optimized by considering only the DL RF status information of the related eNB. The network optimization process is also based on DL RF status information measured in a UE, creating a limitation in measuring and collecting DL RF status information for neighbor eNBs.

Since the network optimization process measures and collects DL RF status information for only a test route, the network optimization process is not performed for any other area, which makes performance of the eNB for any other areas questionable.

In the network optimization process, an analysis engineer directly analyzes DL RF status information which is measured and collected in a drive test process, and detects a problem route in a related test route, and a drive test engineer adjusts an RF parameter and an antenna parameter in order to enhance performance for the problem route. That is, all engineers need to directly perform the network optimization process, creating a costly and time-consuming optimization operation for analyzing DL RF status information, detecting a problem route, and adjusting an RF parameter and an antenna parameter according to the problem route. Thus, there is a need in the art for a more efficient optimization operation.

SUMMARY OF THE INVENTION

The present invention has been made to address at least the above-mentioned problems and/or disadvantages and to provide at least the advantages described below. Accordingly, an aspect of the present invention is to provide an apparatus and method for automatically performing a network optimization process in a mobile communication system.

Another aspect of the present invention is to provide an apparatus and method for automatically performing a network optimization process based on UpLink (UL) RF status information as well as DL RF status information in a mobile communication system.

Another aspect of the present invention is to provide an apparatus and method for automatically performing a network optimization process by estimating DL RF status information of a neighbor eNB based on UL RF status information in a mobile communication system.

Another aspect of the present invention is to provide an apparatus and method for automatically performing a network optimization process by optimizing performance for an entire service area of an eNB as well as a test route in a mobile communication system.

Another aspect of the present invention is to provide an apparatus and method for automatically performing a network optimization process by outputting RF status information in real time in a mobile communication system.

Another aspect of the present invention is to provide an apparatus and method for automatically performing a network optimization process by outputting a network optimization condition which is changed according to a performance analysis result and RF status optimization in real time in a mobile communication system.

Another aspect of the present invention is to provide an apparatus and method for automatically performing a network optimization process by remotely adjusting an RF parameter and an antenna parameter of an eNB in a mobile communication system.

In accordance with an aspect of the present invention, an apparatus for performing a network optimization process in a mobile communication system includes a receiver configured to receive, from the at least one eNB, UL RF information about a UL signal which at least one eNB receives from a device in which a drive test is performed, and receive, from the device, DL RF information about a DL signal which the device receives from the at least one eNB, and a controller configured to predict an RF environment and performance for the at least one eNB based on the UL RF information received from the at least one eNB and the DL RF information received from the device, and determine at least one parameter for network optimization which is applied to the network optimization process based on the predicted RF environment and performance for the at least one eNB.

In accordance with another aspect of the present invention, an eNB in a mobile communication system includes a receiver configured to receive a UL signal from a device in which a drive-test is performed, a controller configured to estimate Radio Frequency (RF) status for the UL signal, and a transmitter configured to transmit a message including UL RF status information indicating the estimated RF status for the UL signal to a UL RF information collecting server, wherein the receiver is further configured to receive a message including the UL RF status information which the eNB transmits and UL RF status information which at least one neighbor eNB transmits from the UL RF information collecting server, where the transmitter is further configured to transmit the received message to an analysis and optimization server.

In accordance with another aspect of the present invention, a method for performing a network optimization process in a mobile communication system includes receiving, from at least one eNB, UL RF information about a UL signal which the at least one eNB receives from a device in which a drive-test is performed, receiving, from the device, DL RF information about a DL signal which the device receives from the at least one eNB, predicting an RF environment and performance for the at least one eNB based on the UL RF information received from the at least one eNB and the DL RF information received from the device, and determining at least one parameter for network optimization which is applied to the network optimization process based on the predicted RF environment and performance for the at least one eNB.

In accordance with another aspect of the present invention, a method for performing a network optimization process in an eNB in a mobile communication system includes receiving a UL signal from a device in which a drive-test is performed, estimating RF status for the UL signal, and transmitting a message including UL RF status information indicating the estimated RF status for the UL signal to a UL RF information collecting server, receiving, from the UL RF information collecting server, a message including the UL RF status information which the eNB transmits and UL RF status information which at least one neighbor eNB transmits, and transmitting the received message to an analysis and optimization server.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EMBODIMENTS OF THE INVENTION

Figure 1:
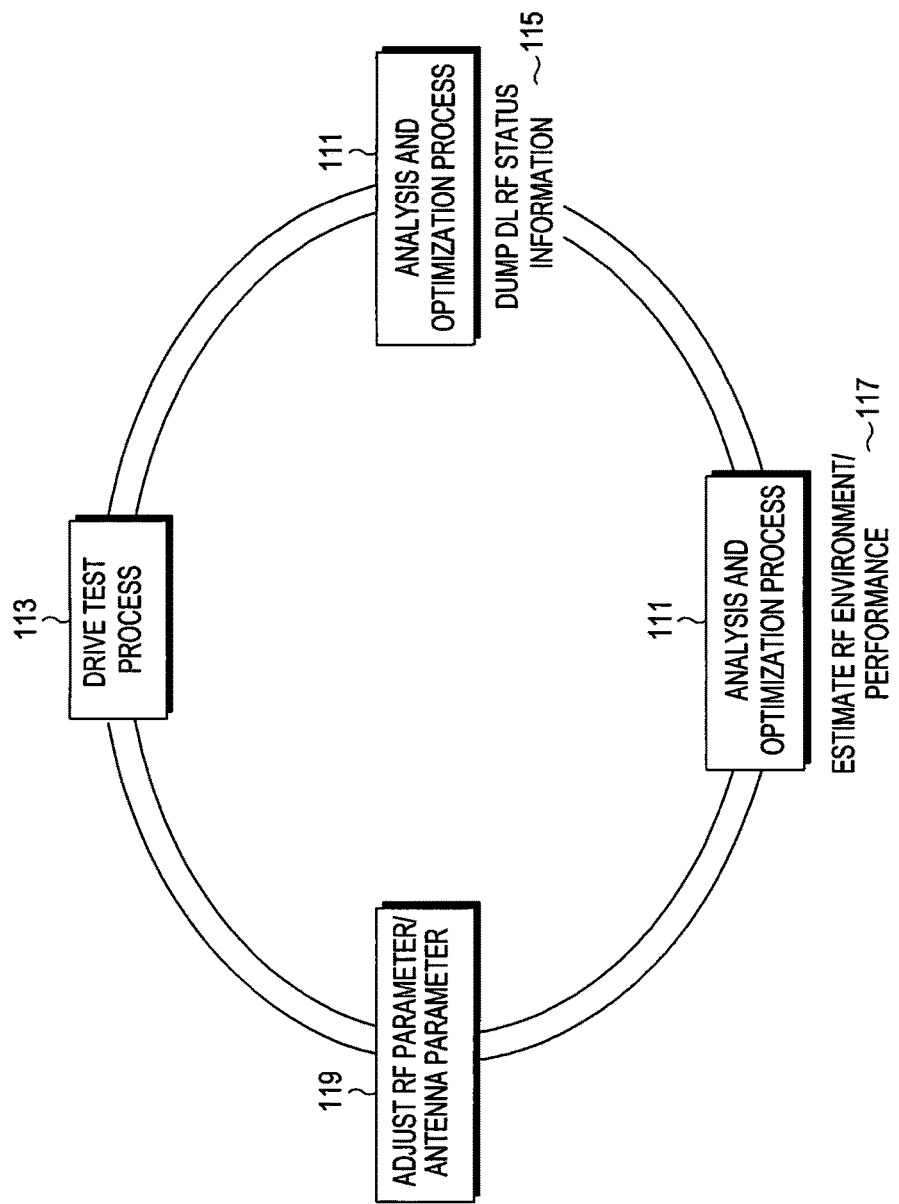
FIG. 1 illustrates a network optimization process performed in a conventional mobile communication system.

The following description with reference to the accompanying drawings is provided to assist in a comprehensive understanding of various embodiments of the present invention as defined by the claims and their equivalents. Those of ordinary skill in the art will recognize that various changes and modifications of the various embodiments described herein can be made without departing from the scope and spirit of the present invention. Descriptions of well-known functions and constructions may be omitted for the sake of clarity and conciseness.

Before undertaking the DETAILED DESCRIPTION below, it may be advantageous to set forth definitions of certain words and phrases used throughout this patent disclosure. For example, the terms "include" and "comprise," as well as derivatives thereof, mean inclusion without limitation; the term "or," is inclusive, meaning and/or; the phrases "associated with" and "associated therewith, "as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this disclosure, those of ordinary skill in the art should understand that in many, if not most instances, such definitions apply to prior, as well as future uses of such defined words and phrases.

The terms and words used in the following description and claims are not limited to the their dictionary meanings, but, are merely used to enable a clear and consistent understanding of the present invention. Accordingly, it should be apparent to those skilled in the art that the following description of various embodiments of the present invention is provided for illustration purposes only and not for the purpose of limiting the present invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first" and "second" will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present invention, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, and a wearable device (e.g., a Head-Mounted Device (HMD), electronic clothes, electronic braces, an electronic necklace, an electronic appcessory, an electronic tattoo, or a smart watch).

According to various embodiments of the present invention, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, and an electronic picture frame.

According to various embodiments of the present invention, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, and an industrial or consumer robot.

According to various embodiments of the present invention, an electronic device may be furniture, part of a building/structure, an electronic board, electronic signature receiving device, a projector, and various measuring devices (e.g., water, electricity, gas or electro-magnetic wave measuring devices) that include communication functionality.

According to various embodiments of the present invention, an electronic device may be any combination of the foregoing devices. In addition, it will be apparent to one having ordinary skill in the art that an electronic device according to various embodiments of the present invention is not limited to the foregoing devices.

According to various embodiments of the present invention, for example, a User Equipment (UE) may be an electronic device.

In embodiment of the present invention, for example, parameters used in a network optimization process are an RF parameter and an antenna parameter; however, it will be understood by those of ordinary skill in the art that parameters other than the RF parameter and the antenna parameter may be used in the network optimization process.

For convenience, it will be assumed in the following description that an RF parameter and an antenna parameter are used in a network optimization process.

A method and apparatus disclosed in various embodiments of the present invention may be applied to various mobile communication systems such as a Long Term Evolution (LTE) mobile communication system, an LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system proposed in a $3^{rd}$ Generation Partnership Project 2 (3GPP2), a Wideband Code Division Multiple Access (WCDMA) mobile communication system proposed in the 3GPP2, a CDMA mobile communication system proposed in the 3GPP2, an Institute of Electrical and Electronics Engineers (IEEE) 802.16m communication system, an Evolved Packet System (EPS), and a mobile Internet Protocol (Mobile IP) system.

Figure 2:
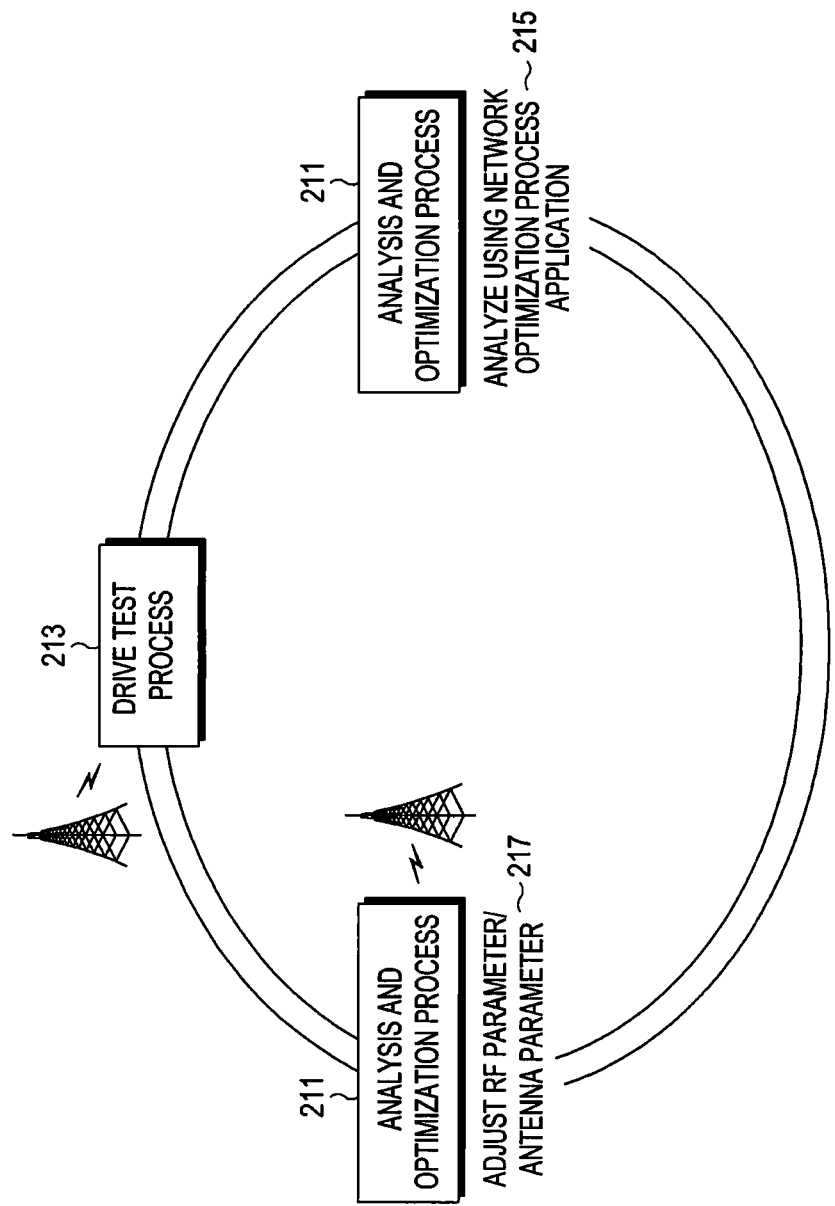
FIG. 2 illustrates a network optimization process performed in a mobile communication system according to an embodiment of the present invention.

FIG. 2 illustrates a network optimization process performed in a mobile communication system according to an embodiment of the present invention.

Referring to FIG. 2, the network optimization process includes an analysis and optimization process 211 and a drive test process 213. The drive test process 213 may be performed in a device, e.g., a UE, and denotes a process that the UE which is mounted on a vehicle measures and collects DL RF status information for an eNB, i.e., a related deployed eNB and neighbor eNBs. A deployed eNB denotes an eNB which is currently deployed.

The DL RF status information may include information such as received signal Channel Quality Information (CQI). For example, the received signal CQI may include at least one of Received Signal Code Power (RSCP), a Reference Signal Strength Indicator (RSSI), Reference Signal Received Quality (RSRQ), a Carrier-to-Interference Noise Ratio (CINR), a Signal-to-Noise Ratio (SNR), and BLock Error Rate (BLER).

The drive test process 213 runs a preset network optimization process application, which denotes an application used for performing the network optimization process. The drive test process 213 measures and collects DL RF status information for a plurality of neighbor eNBs. For convenience, in FIG. 2, it will be assumed that the drive test process 213 measures and collects DL RF status information for a related deployed eNB and one neighbor eNB.

If a cell, i.e., a deployed eNB is deployed, the drive test process 213 measures and collects DL RF status information, e.g., received signal channel quality information for each of the related deployed eNB and the neighbor eNB while moving along a preset test route. In the cell, if the deployed eNB is initially deployed, various parameters such as an RF parameter and an antenna parameter may be set by default.

The RF status information collected in the drive test process 213 is transferred to the analysis and optimization process 211 in real time through the network optimization process application, and the analysis and optimization process 211 receives RF status information, i.e., the DL RF status information for each of the deployed eNB and the neighbor eNB.

The analysis and optimization process 211 analyzes the received RF status information using a preset network optimization process application in step 215. The network optimization process application performed in the analysis and optimization process 211 performs a network optimization process based on the received RF status information. That is, the analysis and optimization process 211 analyzes the RF status information, and remotely adjusts an RF parameter and an antenna parameter for the related deployed eNB based on the analysis result, thereby improving performance of the deployed eNB if performance of the deployed eNB which is collected under a condition of the default RF parameter and the default antenna parameter does not satisfy performance targeted by the mobile communication system in step 217.

As described above, a process including measuring and colleting the RF status information, analyzing the RF status information, and adjusting the RF parameter and the antenna parameter, for example, is a network optimization process. If a performance of the deployed eNB which is acquired based on a related RF parameter and antenna parameter does not satisfy the target performance, the analysis and optimization process 211 changes the related RF parameter and the related antenna parameter to re-perform the network optimization process using the changed RF parameter and the changed antenna parameter. In this manner, the network optimization process is repetitively performed until the performance of the deployed eNB satisfies the target performance. The network optimization process is well-known in the art, so a detailed description will be omitted herein.

As described in FIG. 2, a network optimization process performed in a mobile communication system according to an embodiment of the present invention may be automatically performed without an analysis engineer's intervention.

Figure 3:
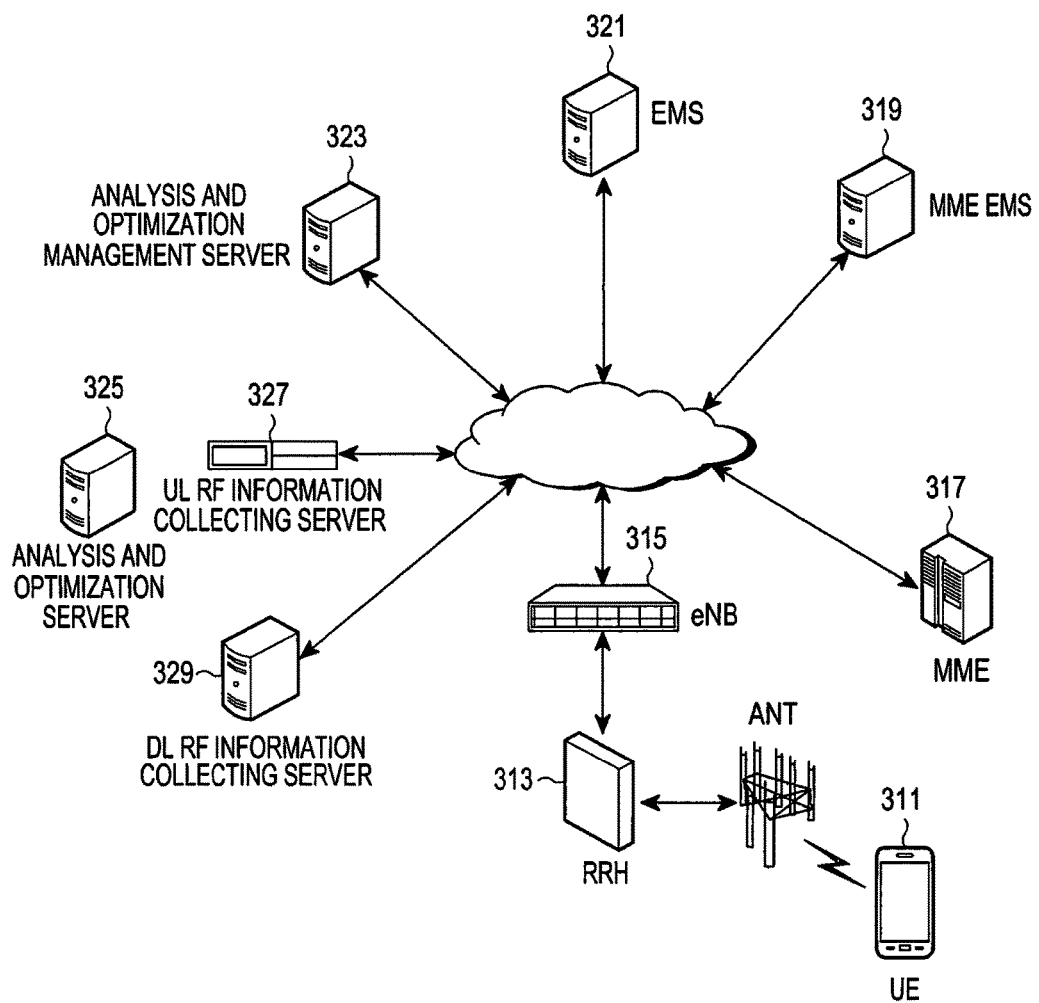
FIG. 3 illustrates a structure of a mobile communication system where a network optimization process is performed according to an embodiment of the present invention.

FIG. 3 illustrates a structure of a mobile communication system where a network optimization process is performed according to an embodiment of the present invention.

Referring to FIG. 3, the mobile communication system includes a UE 311 in which a drive test is performed, a Remote Radio Header (RRH) 313, a Mobility Management Entity (MME) 317, an MME Element Management System (EMS) 319, an EMS 321, an analysis and optimization management server 323, an analysis and optimization server 325, a UL RF information collecting server 327, and a DL RF information collecting server 329. In FIG. 3, a device in which a drive test is performed is a UE; however, it will be understood by those of ordinary skill in the art that the device in which the drive test is performed may also be implemented as other various devices which have mobility.

The analysis and optimization management server 323 is a web based Graphic User Interface (GUI) tool which controls a network optimization process. The analysis and optimization server 325 analyzes RF status information, and performs an operation of adjusting a network optimization condition, i.e., an RF parameter and an antenna parameter. The DL RF information collecting server 329 collects RF status information which the UE 311 measures, collects, and reports.

In FIG. 3, the UE 311 communicates with the eNB 315 through the RRH 313; however, it will be understood by those of ordinary skill in the art that the UE 311 may directly communicate with the eNB 315.

Figure 4:
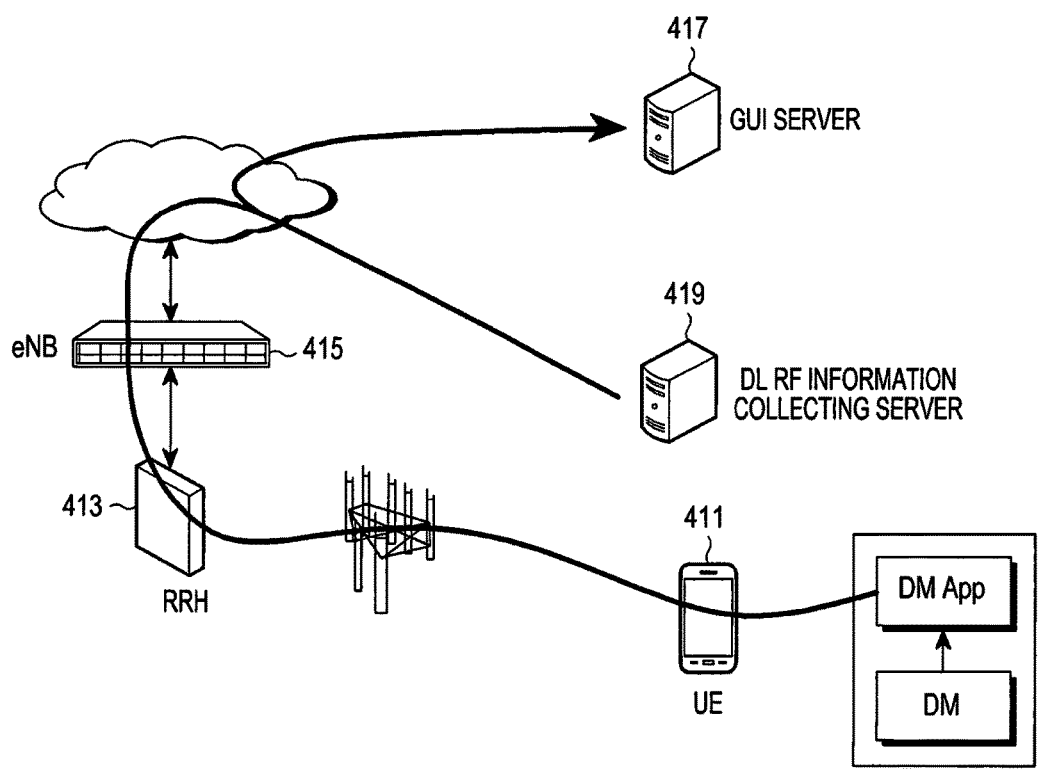
FIG. 4 illustrates a process of acquiring DM information in a network optimization process performed in a mobile communication system according to an embodiment of the present invention.

FIG. 4 illustrates a process of acquiring DM information in a network optimization process performed in a mobile communication system according to an embodiment of the present invention.

Referring to FIG. 4, the mobile communication system includes a UE 411, an RRH 413, an eNB 415, a GUI server 417, and a DL RF information collecting server 419.

The DL RF information collecting server 419 transmits RF status information which the UE 411 transmits in real time to the GUI server 417 through a DM application. The DL RF information collecting server 419 stores the RF status information received from the UE 411. The GUI server 417 uses a private IP address, and the DL RF information collecting server 419 uses a public IP address.

An analysis and optimization server (not shown in FIG. 4) acquires DM information, such as the RF status information which the UE 411 transmits, and estimates an RF environment and performance of the eNB 415 using the RF information.

In FIG. 4, the UE 411 communicates with the eNB 415 through the RRH 413; however, it will be understood by those of ordinary skill in the art that the UE 411 may directly communicate with the eNB 415.

Figure 5:
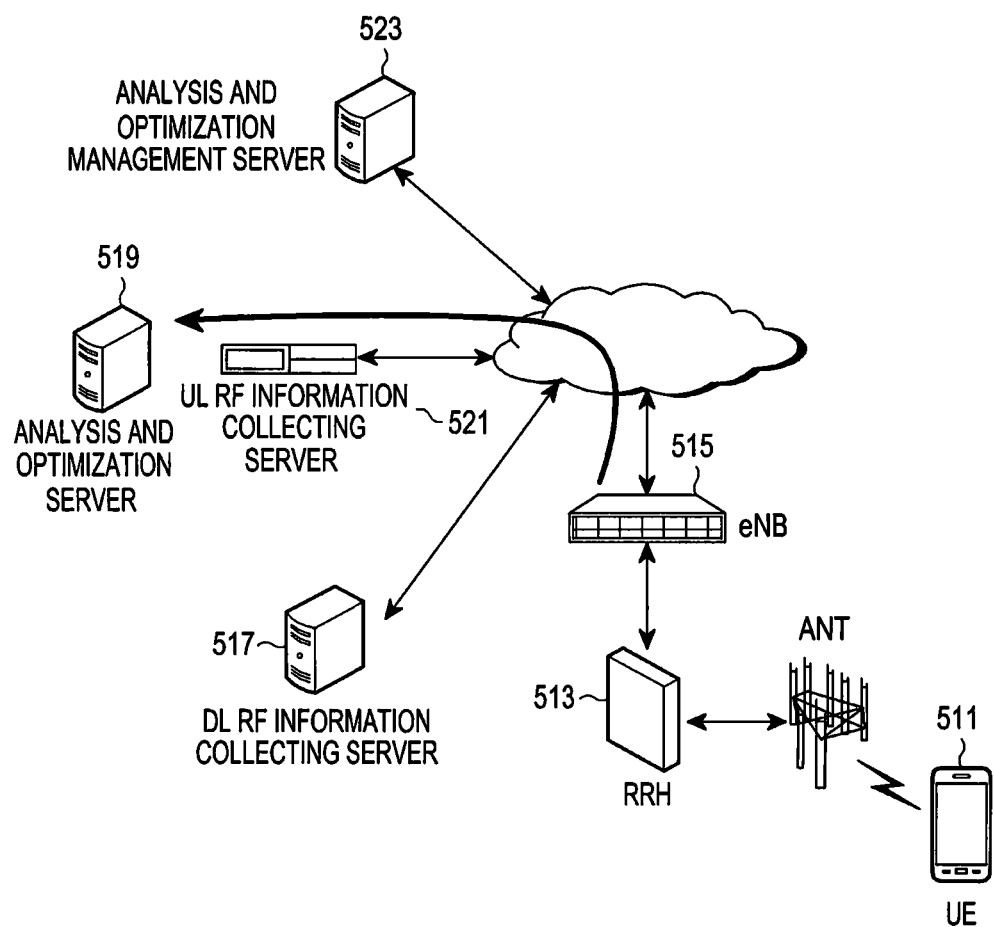
FIG. 5 illustrates a process of acquiring UL RF status information in an eNB in a network optimization process performed in a mobile communication system according to an embodiment of the present invention.

FIG. 5 illustrates a process of acquiring UL RF status information in an eNB in a network optimization process performed in a mobile communication system according to an embodiment of the present invention.

Referring to FIG. 5, the mobile communication system includes a UE 511, an RRH 513, an eNB 515, a DL RF information collecting server 517, an analysis and optimization server 519, a UL RF information collecting server 521, and an analysis and optimization management server 523.

The eNB 515 transmits a trace report message including UL RF status information which the eNB 515 measures and collects using a UL signal transmitted from the UE 511 to the analysis and optimization server 519. In an embodiment of the present invention, the eNB 515 transmits the measured and collected UL RF status information to the analysis and optimization server 519 using the trace report message; however, it will be understood by those of ordinary skill in the art that the eNB 515 may transmit the measured and collected UL RF status information to the analysis and optimization server 519 using another message.

The analysis and optimization server 519 uses the UL RF status information for the eNB 515 received through the trace report message to estimate an RF environment and performance of the eNB 515, and adjusts an RF parameter and an antenna parameter for the eNB 515 according to the estimation result.

In FIG. 5, the UE 511 communicates with the eNB 515 through the RRH 513; however, it will be understood by those of ordinary skill in the art that the UE 511 may directly communicate with the eNB 515.

Figure 6:
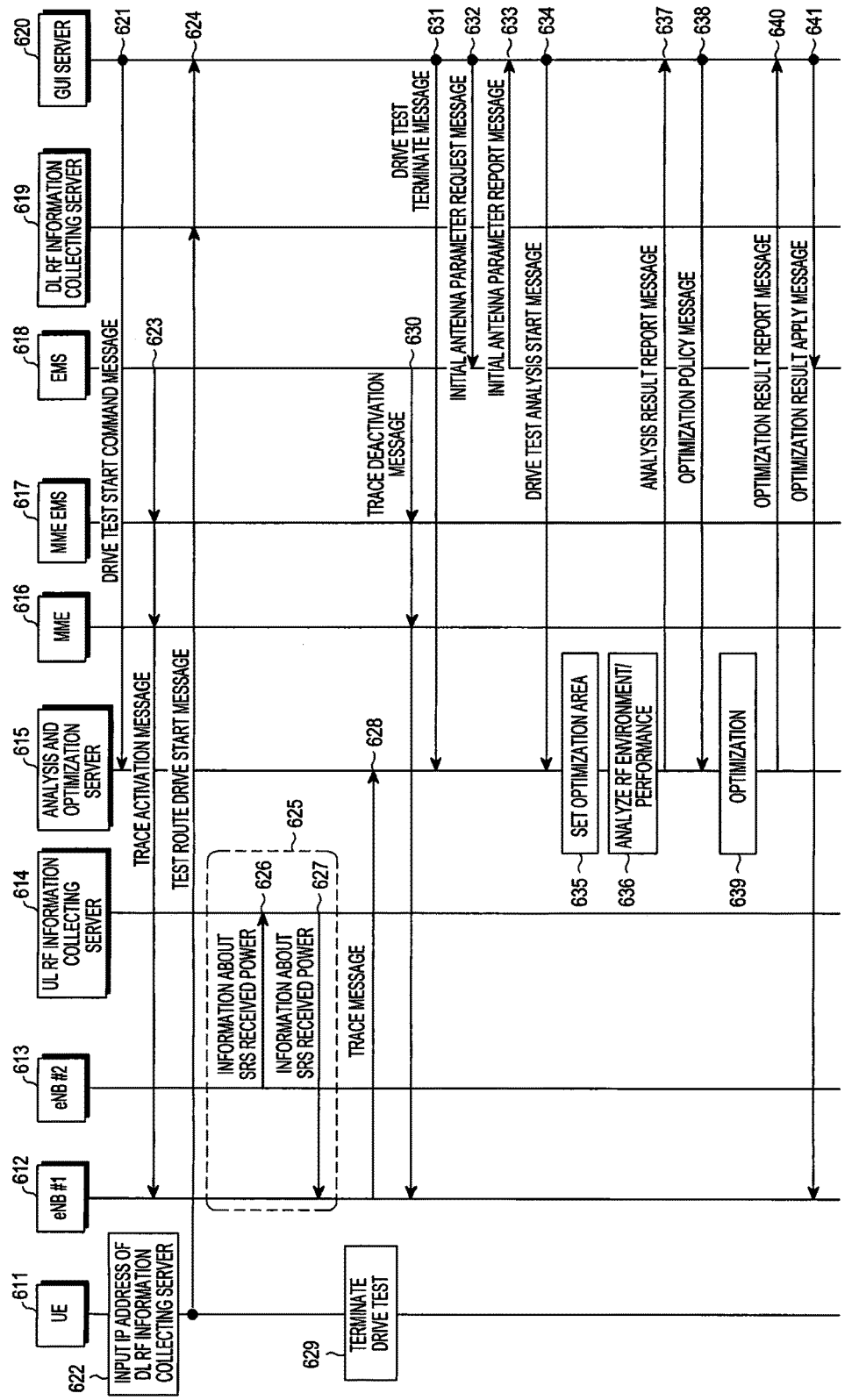
FIG. 6 illustrates a process of performing a network optimization process in a mobile communication system according to an embodiment of the present invention.

FIG. 6 illustrates a process of performing a network optimization process in a mobile communication system according to an embodiment of the present invention.

Referring to FIG. 6, the mobile communication system includes a UE 611, an eNB#1 612, an eNB#2 613, a UL RF information collecting server 614, an analysis and optimization server 615, an MME 616, an MME EMS 617, an EMS 618, a DL RF information collecting server 619, and a GUI server 620.

In FIG. 6, it will be assumed that the eNB#1 612 is a deployed eNB in which a new cell is deployed, and the eNB#2 613 is a neighbor eNB. In FIG. 6, the drive test is performed in the UE 611; however, as described above, it will be understood by those of ordinary skill in the art that the drive test may be performed in unlimited devices.

In FIG. 6, it will be assumed that the number for neighbor eNBs for a deployed eNB where a new cell is deployed is 1; however, as described above, it will be understood by those of ordinary skill in the art that the number of the neighbor eNBs is unlimited.

Upon detecting that there is a need for performing a network optimization process, the GUI server 620 in FIG. 6 transmits a drive test start command message including a drive test start command for commanding to start a drive test to the analysis and optimization server 615 in step 621. The UE 611 inputs an IP address of the DL RF information collecting server 619 in step 622. The EMS 618 transmits a trace activation message to the eNB#1 612 through the MME EMS 617 and the MME 616 in step 623.

The UE 611 transmits a test route drive start message indicating that the UE 611 starts a drive test along a test route to the GUI server 620 through the DL RF information collecting server 619 in step 624. In step 625, the UL RF information collecting server 614 receives a message including UL RF status information, e.g., information about received power for a Sounding Reference Signal (SRS) which the UE 611 transmits from the eNB#2 613 in step 626, and transmits a message including information about received power for the SRS which the UE 611 transmits which the eNB#2 613 transmits to the eNB#1 612 in step 627.

The eNB#1 612 transmits a trace message including UL RF status information which the eNB#1 612 measures and collects, e.g., information about received power for the SRS which the UE 611 transmits, and UL RF status information which the eNB#2 613 measures received from the UL RF collecting server 614 to the analysis and optimization server 615 in step 628. The UE 611 terminates the drive test for the test route in step 629.

Upon detecting that there is no need for tracing the UE 611, the EMS 618 transmits a trace deactivation message including a trace deactivation command for commanding to deactivate trace for the UE 611 to the eNB#1 612 through the MME EMS 617 and the MME 616 in step 630. Upon detecting that there is a need for terminating the drive test for the UE 611, the GUI server 620 transmits a drive test terminate message including a drive test terminate command for commanding to terminate the drive test to the analysis and optimization server 615 in step 631.

The GUI server 620 loads an antenna parameter, and transmits an initial antenna parameter request message including an initial antenna parameter request command for requesting an initial antenna parameter to the EMS 618 in step 632. After receiving the initial antenna parameter request message, the EMS 618 transmits an initial antenna parameter report message including an initial antenna parameter to the GUI server 620 in response to the initial antenna parameter request message in step 633.

Detecting that there is a need for starting a drive test analysis, i.e., a need for starting an analysis for RF status information, the GUI server 620 transmits a drive test analysis start message including a drive test analysis start command for commanding to start a drive test analysis to the analysis and optimization server 615 in step 634. For example, the drive test analysis start message may include an analysis policy, an initial antenna parameter, and DM information.

After receiving the drive test analysis start message from the GUI server 620, the analysis and optimization server 615 sets an optimization area in step 635. After setting the optimization area, the analysis and optimization server 615 analyzes an RF environment and performance for the eNB#1 612 using the analysis policy, the initial antenna parameter and the DM information included in the drive test analysis start message in step 636. The analysis and optimization server 615 transmits an analysis result report message including the RF environment analysis result to the GUI server 620 in step 637.

After receiving the analysis result report message from the analysis and optimization server 615, the GUI server 620 detects that there is a need for drive test optimization for network process optimization, and transmits an optimization policy message including an optimization policy for an RF parameter and an antenna parameter to the analysis and optimization server 615 in step 638. After receiving the optimization policy message from the GUI server 620, the analysis and optimization server 615 optimizes the RF parameter and the antenna parameter in order to optimize performance of the eNB#1 612 in step 639. The analysis and optimization server 615 transmits an optimization result report message including an optimization result for the RF parameter and the antenna parameter to the GUI server 620 in step 640.

After receiving the optimization result report message from the analysis and optimization server 615, the GUI server 620 determines to apply the optimization result included in the optimization result report message, and transmits an optimization result apply message including an optimization result apply command for commanding the eNB#1 612 to adjust the RF parameter and the antenna parameter based on the optimization result that optimizes the performance of the eNB#1 612 to the eNB#1 612 through the EMS 618 in step 641.

Although FIG. 6 illustrates a process of performing a network optimization process in a mobile communication system according to an embodiment of the present invention, various changes could be made to FIG. 6. For example, although shown as a series of operations, various operations in FIG. 6 could overlap, occur in parallel, occur in a different order, or occur multiple times.

Figure 7:
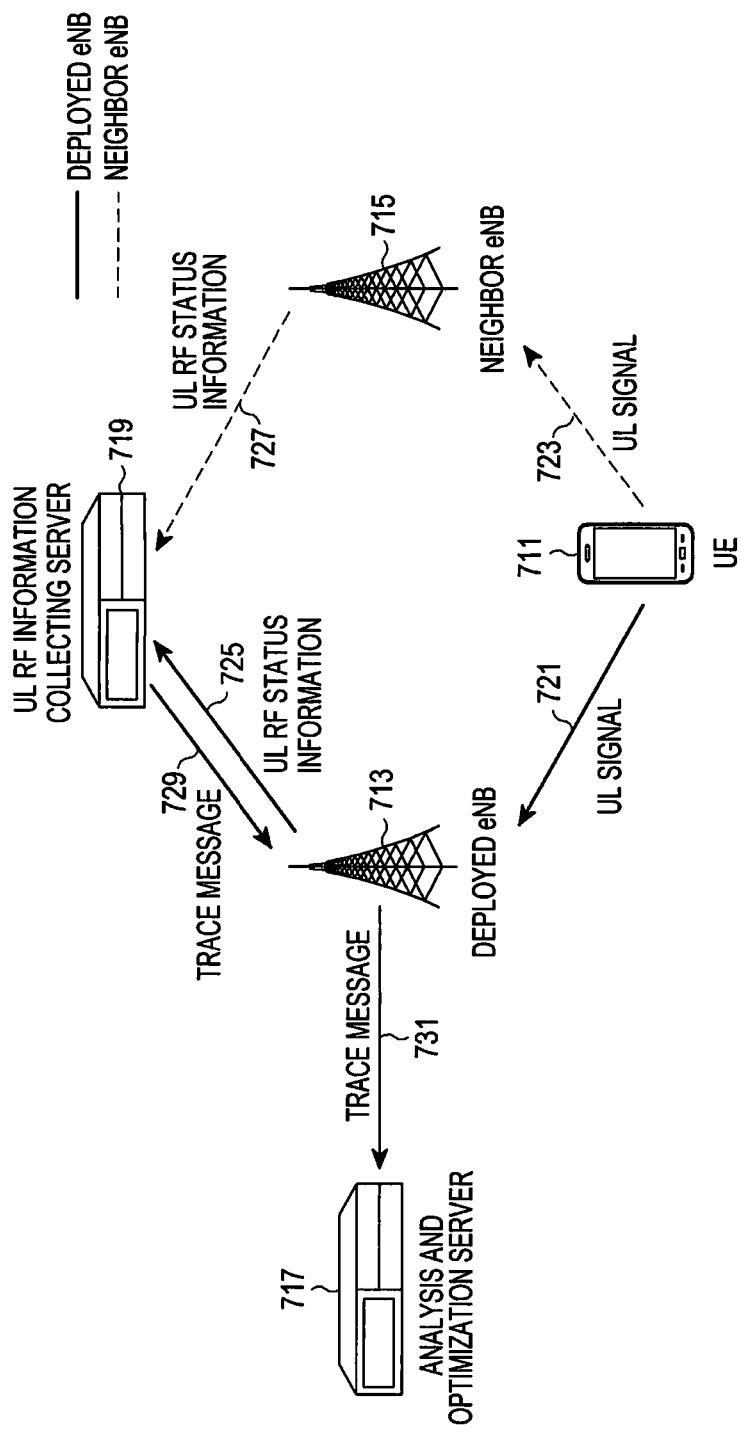
FIG. 7 illustrates a process of measuring and collecting UL RF status information in an eNB in a mobile communication system according to an embodiment of the present invention.

FIG. 7 illustrates a process of measuring and collecting UL RF status information in an eNB in a mobile communication system according to an embodiment of the present invention.

Referring to FIG. 7, the mobile communication system includes a UE 711, a deployed eNB 713, a neighbor eNB 715, an analysis and optimization server 717, and a UL RF information collecting server 719.

In FIG. 7, it will be assumed that the drive test is performed in the UE 711, and the number of neighbor eNBs is 1. Thus, a neighbor eNB for a deployed eNB is only the neighbor eNB 715. The UL RF information collecting server 719 is a central node which controls an operation of each of the deployed eNB 713 and the neighbor eNB 715.

The UE 711 transmits a UL signal, e.g., an SRS, in steps 721 and 723. Each of the deployed eNB 713 and the neighbor eNB 715 receives the UL signal transmitted by the UE 711, estimates RF status for the received UL signal, and transmits a message including RF status information for the estimated UL signal to the UL RF information collecting server 719 in steps 725 and 727. For convenience, RF status information for a UL signal will be referred to as 'UL RF status information'.

After receiving the message including the UL RF status information from each of the deployed eNB 713 and the neighbor eNB 715, the UL RF information collecting server 719 detects UL RF status information which each of the deployed eNB 713 and the neighbor eNB 715 estimates from the message received from each of the deployed eNB 713 and the neighbor eNB 715, and in step 729, transmits a trace message including the detected UL RF status information to the deployed eNB 713.

After receiving the trace message including the UL RF status information which is detected in each of the deployed eNB 713 and the neighbor eNB 715 from the UL RF information collecting server 719, the deployed eNB 713 transmits the trace message received from the UL RF information collecting server 719 to the analysis and optimization server 717 in step 731.

After receiving the trace message from the deployed eNB 713, the analysis and optimization server 717 estimates an RF environment and performance thereof using DL RF status information for each of the deployed eNB 713 and the neighbor eNB 715 which the UE 711 reports and the UL RF status information which is detected in each of the deployed eNB 713 and the neighbor eNB 715 received from the deployed eNB 713, and determines whether there is a need for adjusting a network optimization condition.

As described in FIG. 7, when an eNB measures and collects UL RF status information, UL RF status information which is measured in a neighbor eNB as well as an eNB in which a cell is deployed, i.e., a deployed eNB may be used in a network optimization process. That is, a network optimization process according to an embodiment of the present invention may additionally use UL RF status information compared to a conventional network optimization process, in order to enhance performance of the network optimization process.

Although FIG. 7 illustrates a process of measuring and collecting UL RF status information in an eNB in a mobile communication system according to an embodiment of the present invention, various changes could be made to FIG. 7. For example, although shown as a series of operations, various operations in FIG. 7 could overlap, occur in parallel, occur in a different order, or occur multiple times.

Figure 8:
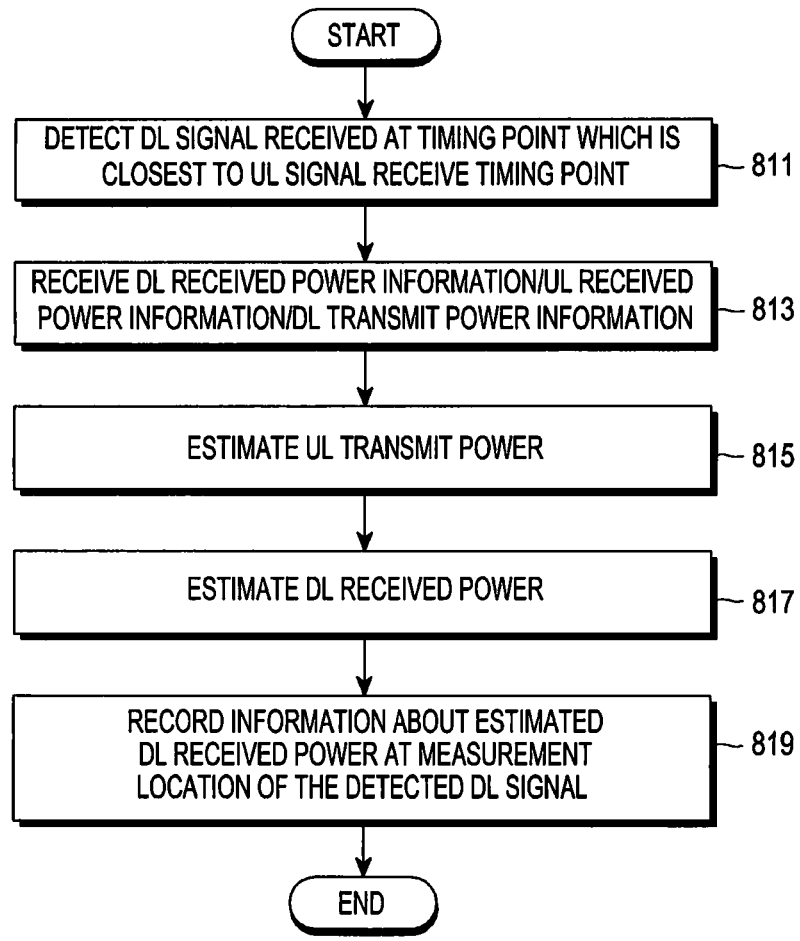
FIG. 8 illustrates a process of estimating DL received power in an analysis and optimization server in a mobile communication system according to an embodiment of the present invention.

FIG. 8 illustrates a process of estimating DL received power in an analysis and optimization server in a mobile communication system according to an embodiment of the present invention.

Referring to FIG. 8, it will be noted that a process of estimating DL received power in an analysis and optimization server is a process of estimating DL received power based on synchronization between a DL signal and a UL signal.

The analysis and optimization server detects a DL signal which a UE receives at a timing point which is closest to a UL signal receive timing point of the UE in which a drive test is performed in step 811. The analysis and optimization server receives DL received power information from the UE, and transmits UL received power information and DL transmits power information to a deployed eNB in step 813. Receiving the DL received power information from the UE, and transmitting the UL received power information and the DL transmit power information to the deployed eNB has been described above, so a detailed description will be omitted herein.

The analysis and optimization server detects UL received power and DL received power, and estimates UL transmit power using the detected UL received power and the detected DL received power in step 815. The analysis and optimization server estimates DL received power using the detected UL received power and the estimated UL transmit power in step 817. In step 819, the analysis and optimization server records information about the estimated DL received power at a measurement location of the DL signal which is detected in step 811.

It will be understood that the number of DL signal measurement samples virtually increases through operations 811 to 819 in FIG. 8.

Although FIG. 8 illustrates a process of estimating DL received power in an analysis and optimization server in a mobile communication system according to an embodiment of the present invention, various changes could be made to FIG. 8. For example, although shown as a series of operations, various operations in FIG. 8 could overlap, occur in parallel, occur in a different order, or occur multiple times.

Figure 9:
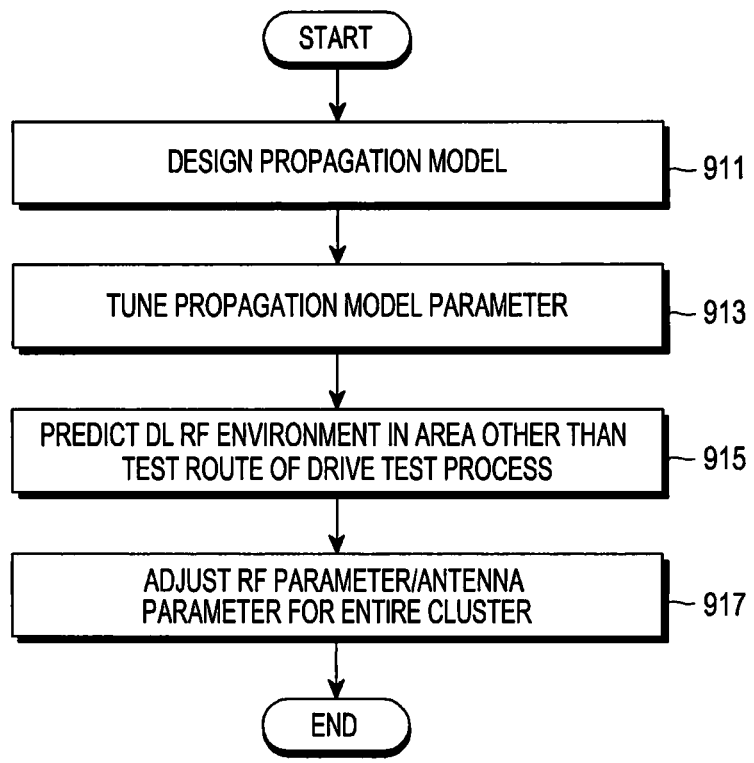
FIG. 9 illustrates a process of predicting an RF environment and adjusting an RF parameter/antenna parameter in an analysis and optimization server in a mobile communication system according to an embodiment of the present invention.

FIG. 9 illustrates a process of predicting an RF environment and adjusting an RF parameter/antenna parameter in an analysis and optimization server in a mobile communication system according to an embodiment of the present invention.

It will be noted that the process of FIG. 9 is for predicting an RF environment and adjusting an RF parameter/antenna parameter for an entire cluster as well as a test route of a UE in which a drive test is performed.

Here, the predicting of the RF environment means the followings:

(1) The analysis and optimization server collects DL UE measurement information, e.g., a measurement location, measurement time, DL received signal strength, such as Reference Signal Received Power (RSRP), Reference Signal Received Quality (RSRQ), a Reference Signal Strength Indicator (RSSI), and the like, a Signal to Interference and Noise Ratio (SINR), DL resource use rate, and the like.

(2) The analysis and optimization server collects serving cell information and neighbor cell information such as a PCI, frequency, Cell ID, and the like, which a UE measures.

(3) The analysis and optimization server collects UL measurement information which a serving cell of the UE collects, such as UL received signal strength, measurement time information, and the like.

(4) The analysis and optimization server collects UL measurement information, which a neighbor cell of the UE collects, such as UL received signal strength, measurement time information, and the like.

(5) The analysis and optimization server synchronizes a time at which the serving cell of the UE collects the UL measurement information and a time at which the neighbor cell of the UE collects the UL measurement information with a time at which the analysis and optimization server collects the DL UE measurement information.

(6) The analysis and optimization server tunes a propagation model parameter based on the DL UE measurement information, the UL measurement information which the serving cell of the UE collects, and the UL measurement information which the neighbor cell of the UE collects.

(7) The analysis and optimization server predicts a DL/UL electric field based on the tuned propagation model parameter.

The analysis and optimization server designs a propagation model in step 911. The analysis and optimization server generates a new DL signal using a collected DL signal and a collected UL signal, and tunes a propagation model parameter used in the propagation model using the new DL signal in step 913. The analysis and optimization server predicts DL received power, i.e., a DL RF environment in an area other than a test route along which a UE performs a drive test using a propagation model of the propagation model parameter is tuned in step 915.

The analysis and optimization server adjusts an RF parameter and an antenna parameter for an entire cluster which is a target for a network optimization process including the test route based on the predicted DL received power in step 917. The adjustment for the RF parameter/antenna parameter is performed in order to acquire the optimal performance which the network optimization process intends to achieve.

Although FIG. 9 illustrates a process of predicting an RF environment and adjusting an RF parameter/antenna parameter in an analysis and optimization server in a mobile communication system according to an embodiment of the present invention, various changes could be made to FIG. 9. For example, although shown as a series of operations, various operations in FIG. 9 could overlap, occur in parallel, occur in a different order, or occur multiple times.

Figure 10:
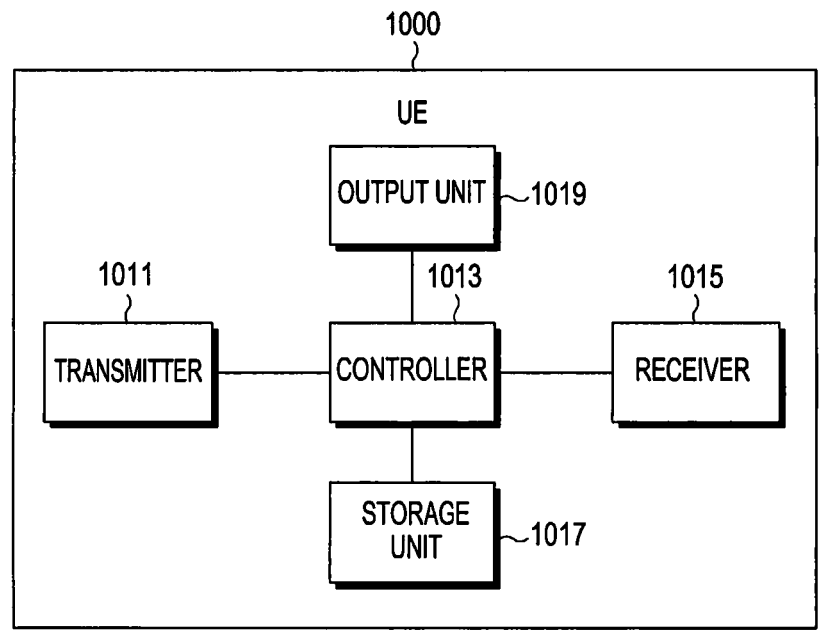
FIG. 10 illustrates an inner structure of a UE in a mobile communication system according to an embodiment of the present invention.

FIG. 10 illustrates an inner structure of a UE in a mobile communication system according to an embodiment of the present invention.

Referring to FIG. 10, a UE 1000 includes a transmitter 1011, a controller 1013, a receiver 1015, a storage unit 1017, and an output unit 1019. Although the drive test is performed in the UE 1000, the drive test may also be performed in various other devices.

The controller 1013 controls the overall operation of the UE 1000. More particularly, the controller 1013 controls an operation related to a network optimization process performed in a mobile communication system, which has been described with reference to FIGS. 2 to 9, and thus a description thereof will be omitted herein.

The transmitter 1011 transmits various signals and messages, which have been described in FIGS. 2 to 9, to other entities, e.g., a deployed eNB, under a control of the controller 1013.

The receiver 1015 receives various signals and messages, which have also been described in FIGS. 2 to 9, from other entities, e.g., a deployed eNB, under a control of the controller 1013.

The storage unit 1017 stores a program and various data related to the operation related to the network optimization process which the UE 1000 performs under the control of the controller 1013. The storage unit 1017 stores the various signals and messages received in the receiver 1015.

The output unit 1019 outputs various signals and messages, which have also been described in FIGS. 2 to 9, related to the operation of the network optimization process which the UE 1000 performs under the control of the controller 1013.

While the transmitter 1011, controller 1013, receiver 1015, storage unit 1017, and output unit 1019 are described as separate units, it is to be understood that this is merely for convenience of description. In other words, two or more of the transmitter 1011, controller 1013, receiver 1015, storage unit 1017, and output unit 1019 may be incorporated into a single unit. The UE 1000 may be implemented as one processor.

Figure 11:
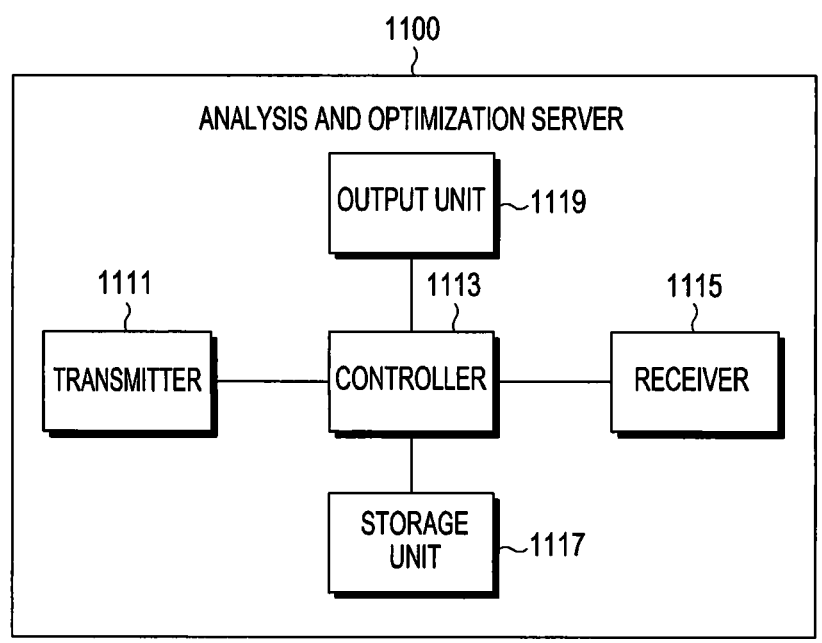
FIG. 11 illustrates an inner structure of an analysis and optimization server in a mobile communication system according to an embodiment of the present.

FIG. 11 illustrates an inner structure of an analysis and optimization server in a mobile communication system according to an embodiment of the present.

Referring to FIG. 11, an analysis and optimization server 1100 includes a transmitter 1111, a controller 1113, a receiver 1115, a storage unit 1117, and an output unit 1119.

The controller 1113 controls the overall operation of the analysis and optimization server 1100. More particularly, the controller 1113 controls an operation related to a network optimization process performed in a mobile communication system, which has been described with reference to FIGS. 2 to 9, and thus a description thereof will be omitted herein.

The transmitter 1111 transmits various signals and messages, which have been described in FIGS. 2 to 9, to other entities, e.g., a UE where a drive test is performed and a deployed eNB, under a control of the controller 1113.

The receiver 1115 receives various signals and messages, which have also been described in FIGS. 2 to 9, from other entities, e.g., a UE and a deployed eNB, under a control of the controller 1113.

The storage unit 1117 stores a program and various data related to the operation related to the network optimization process which the analysis and optimization server 1100 performs under the control of the controller 1113.

The storage unit 1117 stores the various signals and messages received in the receiver 1115.

The output unit 1119 outputs various signals and messages, which have also been described in FIGS. 2 to 9, related to the operation of the network optimization process which the analysis and optimization server 1100 performs under the control of the controller 1113.

While the transmitter 1111, controller 1113, receiver 1115, storage unit 1117, and output unit 1119 are described as separate units, it is to be understood that this is merely for convenience of description. In other words, two or more of the transmitter 1111, controller 1113, receiver 1115, storage unit 1117, and output unit 1119 may be incorporated into a single unit. The analysis and optimization server 1100 may be implemented as one processor.

Figure 12:
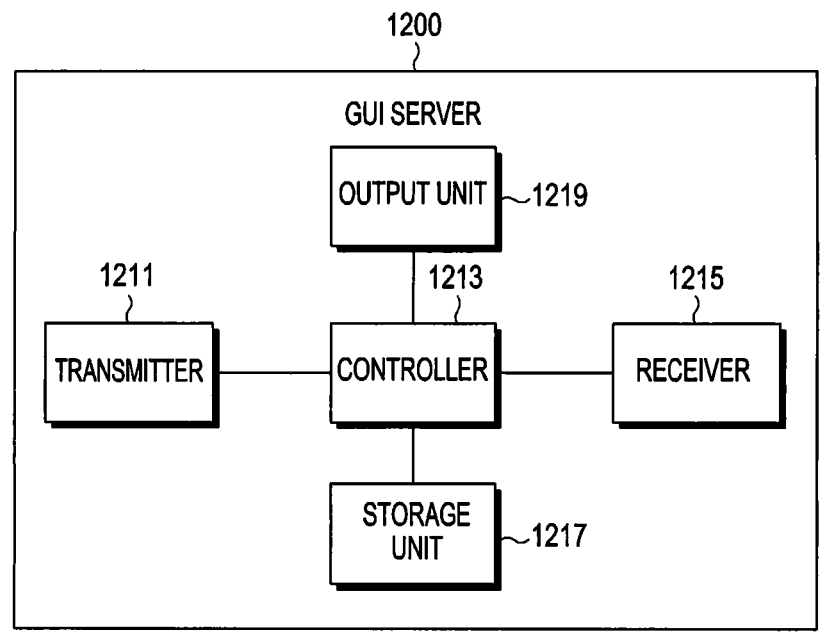
FIG. 12 illustrates an inner structure of a GUI server in a mobile communication system according to an embodiment of the present invention.

FIG. 12 illustrates an inner structure of a GUI server in a mobile communication system according to an embodiment of the present invention.

Referring to FIG. 12, a GUI server 1200 includes a transmitter 1211, a controller 1213, a receiver 1215, a storage unit 1217, and an output unit 1219.

The controller 1213 controls the overall operation of the GUI server 1200. More particularly, the controller 1213 controls an operation related to a network optimization process performed in a mobile communication system, which has been described with reference to FIGS. 2 to 9, and thus a description thereof will be omitted herein.

The transmitter 1211 transmits various signals and messages, which have been described in FIGS. 2 to 9, to other entities, e.g., a UE where a drive test is performed and an analysis and optimization server, under a control of the controller 1213.

The receiver 1215 receives various signals and messages, which have also been described in FIGS. 2 to 9, from other entities, e.g., a UE and an analysis and optimization server, under a control of the controller 1213.

The storage unit 1217 stores a program and various data related to the operation related to the network optimization process which the GUI server 1200 performs under the control of the controller 1213.

The storage unit 1217 stores the various signals and messages received in the receiver 1215.

The output unit 1219 outputs various signals and messages, which have also been described in FIGS. 2 to 9, related to the operation of the network optimization process which the GUI server 1200 performs under the control of the controller 1213.

While the transmitter 1211, controller 1213, receiver 1215, storage unit 1217, and output unit 1219 are described as separate units, it is to be understood that this is merely for convenience of description. In other words, two or more of the transmitter 1211, controller 1213, receiver 1215, storage unit 1217, and output unit 1219 may be incorporated into a single unit. The GUI server 1200 may be implemented as one processor.

Figure 13:
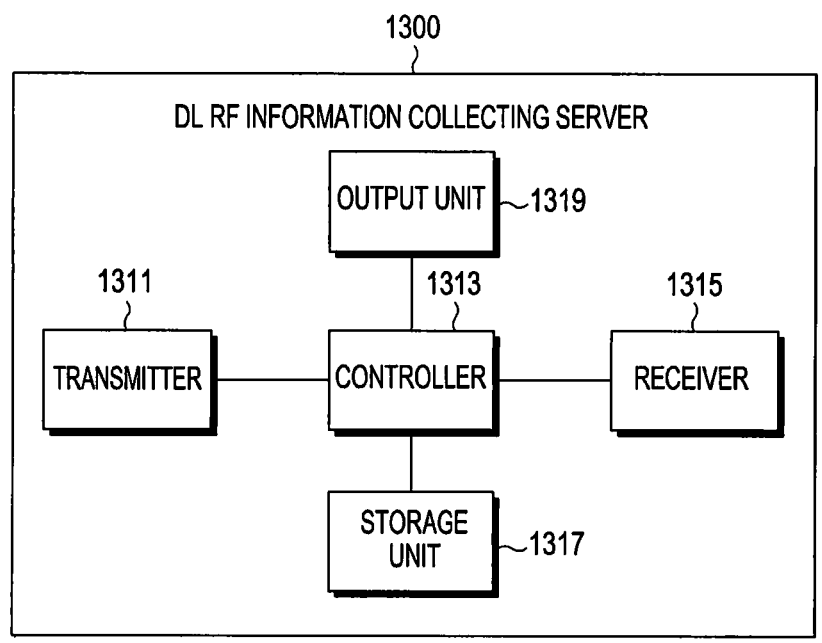
FIG. 13 illustrates an inner structure of a DL RF information collecting server in a mobile communication system according to an embodiment of the present invention.

FIG. 13 illustrates an inner structure of a DL RF information collecting server in a mobile communication system according to an embodiment of the present invention.

Referring to FIG. 13, a DL RF information collecting server 1300 includes a transmitter 1311, a controller 1313, a receiver 1315, a storage unit 1317, and an output unit 1319.

The controller 1313 controls the overall operation of the DL RF information collecting server 1300. More particularly, the controller 1313 controls an operation related to a network optimization process performed in a mobile communication system, which has been described with reference to FIGS. 2 to 9, and thus a description thereof will be omitted herein.

The transmitter 1311 transmits various signals and messages, which have been described in FIGS. 2 to 9, to other entities, e.g., a UE where a drive test is performed, under a control of the controller 1313.

The receiver 1315 receives various signals and messages, which have also been described in FIGS. 2 to 9, from other entities, e.g., a UE, under a control of the controller 1313.

The storage unit 1317 stores a program and various data related to the operation of the network optimization process which the DL RF information collecting server 1300 performs under the control of the controller 1313.

The storage unit 1317 stores the various signals and messages received in the receiver 1315.

The output unit 1319 outputs various signals and messages, which have also been described in FIGS. 2 to 9, related to the operation of the network optimization process which the DL RF information collecting server 1300 performs under the control of the controller 1313.

While the transmitter 1311, controller 1313, receiver 1315, storage unit 1317, and output unit 1319 are described as separate units, it is to be understood that this is merely for convenience of description. In other words, two or more of the transmitter 1311, controller 1313, receiver 1315, storage unit 1317, and output unit 1319 may be incorporated into a single unit. The DL RF information collecting server 1300 may be implemented as one processor.

Figure 14:
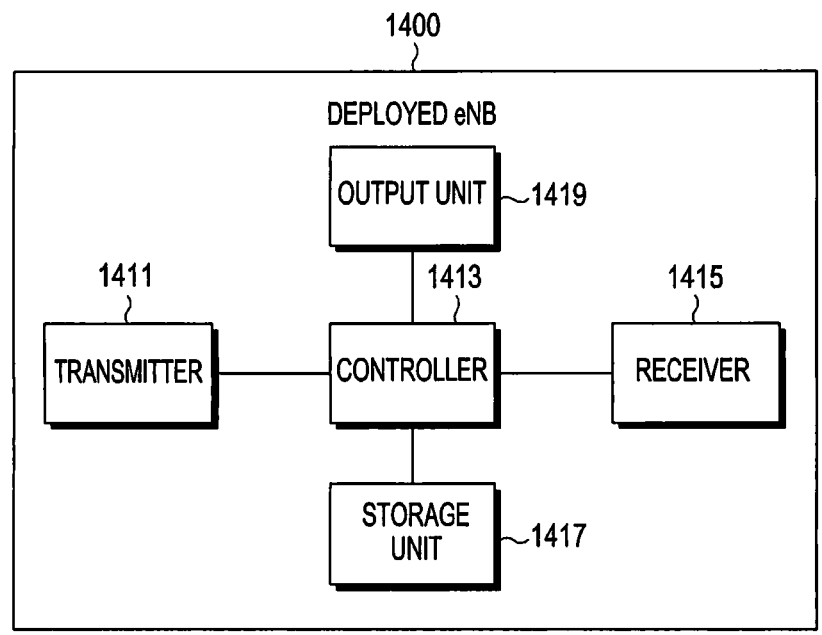
FIG. 14 illustrates an inner structure of a deployed eNB in a mobile communication system according to an embodiment of the present invention.

FIG. 14 illustrates an inner structure of a deployed eNB in a mobile communication system according to an embodiment of the present invention.

Referring to FIG. 14, a deployed eNB 1400 includes a transmitter 1411, a controller 1413, a receiver 1415, a storage unit 1417, and an output unit 1419.

The controller 1413 controls the overall operation of the deployed eNB 1400. More particularly, the controller 1413 controls an operation related to a network optimization process performed in a mobile communication system, which has been described with reference to FIGS. 2 to 9, and thus a description thereof will be omitted herein.

The transmitter 1411 transmits various signals and messages, which have been described in FIGS. 2 to 9, to other entities, e.g., a UE where a drive test is performed and an analysis and optimization server, under a control of the controller 1413.

The receiver 1415 receives various signals and messages, which have also been described in FIGS. 2 to 9, from other entities, e.g., a UE and an analysis and optimization server, under a control of the controller 1413.

The storage unit 1417 stores a program and various data related to the operation of the network optimization process which the deployed eNB 1400 performs under the control of the controller 1413.

The storage unit 1417 stores the various signals and messages received in the receiver 1415.

The output unit 1419 outputs various signals and messages, which have also been described in FIGS. 2 to 9, related to the operation of the network optimization process which the deployed eNB 1400 performs under the control of the controller 1413.

While the transmitter 1411, controller 1413, receiver 1415, storage unit 1417, and output unit 1419 are described as separate units, it is to be understood that this is merely for convenience of description. In other words, two or more of the transmitter 1411, controller 1413, receiver 1415, storage unit 1417, and output unit 1419 may be incorporated into a single unit. The deployed eNB 1400 may be implemented as one processor.

Figure 15:
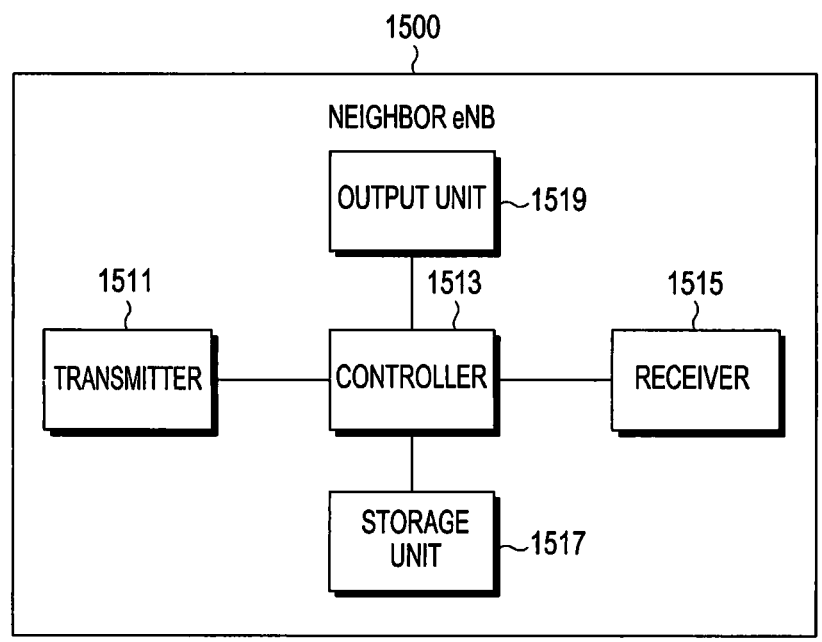
FIG. 15 illustrates an inner structure of a neighbor eNB in a mobile communication system according to an embodiment of the present invention.

FIG. 15 illustrates an inner structure of a neighbor eNB in a mobile communication system according to an embodiment of the present invention.

Referring to FIG. 15, a neighbor eNB 1500 includes a transmitter 1511, a controller 1513, a receiver 1515, a storage unit 1517, and an output unit 1519.

The controller 1513 controls the overall operation of the neighbor eNB 1500. More particularly, the controller 1513 controls an operation related to a network optimization process performed in a mobile communication system, which has been described with reference to FIGS. 2 to 9, and thus a description thereof will be omitted herein.

The transmitter 1511 transmits various signals and messages, which have been described in FIGS. 2 to 9, to other entities, e.g., a UE where a drive test is performed and an analysis and optimization server, under a control of the controller 1513.

The receiver 1515 receives various signals and messages, which have also been described in FIGS. 2 to 9, from other entities, e.g., a UE and an analysis and optimization server, under a control of the controller 1513.

The storage unit 1517 stores a program and various data related to the operation related to the network optimization process which the neighbor eNB 1500 performs under the control of the controller 1513.

The storage unit 1517 stores the various signals messages received in the receiver 1515.

The output unit 1519 outputs various signals and messages, which have also been described in FIGS. 2 to 9, related to the operation of the network optimization process which the neighbor eNB 1500 performs under the control of the controller 1513.

While the transmitter 1511, controller 1513, receiver 1515, storage unit 1517, and output unit 1519 are described as separate units, it is to be understood that this is merely for convenience of description. In other words, two or more of the transmitter 1511, controller 1513, receiver 1515, storage unit 1517, and output unit 1519 may be incorporated into a single unit. The neighbor eNB 1500 may be implemented as one processor.

As is apparent from the foregoing description, an embodiment of the present invention enables automatic performance of a network optimization process based on UL RF status information as well as DL RF status information in a mobile communication system.

An embodiment of the present invention enables automatic performance of a network optimization process by estimating RF status information of a neighbor eNB based on UL RF status information in a mobile communication system.

An embodiment of the present invention enables automatic performance of a network optimization process by optimizing performance for an entire service area of an eNB as well as a test route in a mobile communication system.

An embodiment of the present invention enables automatic performance of a network optimization process by outputting RF status information in real time in a mobile communication system.

An embodiment of the present invention enables automatic performance of a network optimization process by outputting a network optimization condition which is changed according to a performance analysis result and RF status optimization in real time in a mobile communication system.

An embodiment of the present invention enables automatic performance of a network optimization process by remotely adjusting an RF parameter and an antenna parameter of an eNB in a mobile communication system.

Certain aspects of the present invention may also be embodied as computer readable code on a non-transitory computer readable recording medium. A non-transitory computer readable recording medium is any data storage device that can store data, which can be thereafter read by a computer system. Examples of the non-transitory computer readable recording medium include Read Only Memory (ROM), Random Access Memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present invention can be easily construed by programmers skilled in the art to which the present invention pertains.

It can be appreciated that a method and apparatus according to an embodiment of the present invention may be implemented by hardware, software and/or a combination thereof. The software may be stored in a non-volatile storage, for example, an erasable or re-writable ROM, a memory, for example, a RAM, a memory chip, a memory device, or a memory Integrated Circuit (IC), or an optically or magnetically recordable non-transitory machine-readable (e.g., computer-readable), storage medium (e.g., a Compact Disk (CD), a Digital Versatile Disk (DVD), a magnetic disk, and magnetic tape). A method and apparatus according to an embodiment of the present invention may be implemented by a computer or a mobile terminal that includes a controller and a memory, and the memory may be an example of a non-transitory machine-readable (e.g., computer-readable), storage medium suitable to store a program or programs including instructions for implementing various embodiments of the present invention.

The present invention may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present invention may include their equivalents.

An apparatus according to an embodiment of the present invention may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method, by a second server, for performing a network optimization process in a mobile communication system, the method comprising:
    receiving, from a first server through a serving base station (BS), UpLink (UL) channel information about a UL signal which each of a plurality of BSs receives from a user equipment (UE) in which a drive test is performed, wherein the plurality of the BSs includes the serving BS and at least one neighbor BS, and wherein the UL channel information comprises first information indicating a first channel status estimated by the serving BS for a first UL signal received from the UE and second information indicating a second channel status estimated by the at least one neighbor BS for a second UL signal received from the UE;
    receiving DownLink (DL) channel information about a DL signal which the UE receives from each of the plurality of the BSs;
    predicting a channel environment for the plurality of the BSs based on the UL channel information and the DL channel information; and
    determining at least one parameter for network optimization based on the predicted channel environment,
    wherein the DL signal is received by the UE at a timing point closest to a timing point of the UL signal of the UE on which the drive test is performed.

2. The method of claim 1, further comprising:
    adjusting, to the plurality of the BSs, the determined at least one parameter for the network optimization.

3. The method of claim 1, wherein predicting the channel status comprises:
    detecting the DL signal;
    detecting UL received power and DL received power;
    estimating UL transmit power based on the detected UL received power and the detected DL received power;
    estimating DL received power based on the detected UL received power and the estimated UL transmit power; and
    detecting location information about the estimated DL received power as a measurement location of the DL signal which the UE receives at the timing point which is closest to the UL signal timing point of the UE.

4. The method of claim 1, further comprising:
    designing a propagation model;
    estimating a DL signal from the at least one neighbor BS using a collected DL signal and a collected UL signal;
    tuning a propagation model parameter used in the propagation model using the collected DL signal and the estimated DL signal;
    predicting a DL channel environment in an area other than a test route for the UE using a propagation model to which the propagation model parameter is tuned; and
    determining the at least one parameter for network optimization for an entire cluster including the test route based on the predicted channel environment.

5. The method of claim 1, wherein the at least one parameter for the network optimization includes at least one of a channel parameter and an antenna parameter.

6. The method of claim 1, further comprising:
    outputting the determined at least one parameter for the network optimization which is applied to the network optimization process in real time.

7. A method, by a base station (BS), for performing a network optimization process in a mobile communication system, the method comprising:
    receiving a first UpLink (UL) signal from a user equipment (UE) in which a drive test is performed;
    estimating a first channel status for the first UL signal;
    transmitting, to a first server, a first message including first information indicating the first channel status;
    receiving, from the first server, a second message including the first information indicating the first channel status and second information indicating a second channel status estimated by at least one neighbor BS for a second UL signal received from the UE; and
    transmitting, to a second server, the second message including the first information and the second information,
    wherein a downlink (DL) signal is received by the UE at a timing point closest to a timing point of the first UL signal of the UE on which the drive test is performed.

8. The method of claim 7,
    wherein the second message is transmitted in real time.

9. A second server for performing a network optimization process in a mobile communication system, the second server comprising:
    a receiver configured to:
        receive, from a first server through a serving base station (BS), UpLink (UL) channel information about a UL signal which each of the plurality of BSs receives from a user equipment (UE) in which a drive test is performed, wherein the plurality of the BSs includes the serving BS and at least one neighbor BS, and wherein the UL channel information comprises first information indicating a first channel status estimated by the serving BS for a first UL signal received from the UE and second information indicating a second channel status estimated by the at least one neighbor BS for a second UL signal received from the UE, and
        receive DownLink (DL) channel information about a DL signal which the UE receives from each of the plurality of the BS; and
    a controller configured to:
        predict a channel environment for the plurality of the BSs based on the UL channel information and the DL channel information, and
        determine at least one parameter for network optimization based on the predicted channel environment,
        wherein the DL signal is received by the UE at a timing point closest to a timing point of the UL signal of the UE on which the drive test is performed.

10. The second server of claim 9, wherein the controller is further configured to adjust, to the plurality of the BSs, the at least one parameter for the network optimization.

11. The second server of claim 9, wherein the controller is further configured to:
    detect the DL signal,
    detect UL received power and DL received power, estimate UL transmit power based on the detected UL received power and the detected DL received power, estimate DL received power based on the detected UL received power and the estimated UL transmit power, and detect location information about the estimated DL received power as a measurement location of the DL signal which the UE receives at the timing point which is closest to the UL signal timing point of the UE.

12. The second server of claim 9, wherein the controller is further configured to:

design a propagation model, estimate a DL signal from the at least one neighbor BS using a collected DL signal and a collected UL signal, tune a propagation model parameter used in the propagation model using the collected DL signal and the estimated DL signal, predict a DL channel environment in an area other than a test route for the UE using a propagation model to which the propagation model parameter is tuned, and determine the at least one parameter for network optimization for an entire cluster including the test route based on the predicted channel environment.

13. The second server of claim 9, wherein the at least one parameter for the network optimization includes at least one of a channel parameter and an antenna parameter.

14. The second server of claim 9, wherein the controller is further configured to:

output the determined at least one parameter for the network optimization which is applied to the network optimization process in real time.

15. A base station (BS) in a mobile communication system, the BS comprising:

a receiver;

a transmitter; and a controller configured to:

receive a first UpLink (UL) signal from a user equipment (UE) in which a drive test is performed, via the receiver;

estimate a first channel status for the first UL signal; and transmit, to a first server, a first message including first information indicating the first channel status, via the transmitter, receive, from the first server, a second message including the first information indicating the first channel status and second information indicating a second channel status estimated by at least one neighbor BS for a second UL signal received from the UE, via the receiver, and transmit, to a second server, the second message including the first information and the second information, via the transmitter, wherein a downlink (DL) signal is received by the UE at a timing point closest to a timing point of the first UL signal of the UE on which the drive test is performed.

16. The BS of claim 15, wherein the second message is transmitted in real time.

* * * * *